May 14, 1963 R. W. EVANS 3,089,253
MEANS FOR AERATING GRANULAR AND PULVERULENT MATERIALS
Filed Nov. 24, 1958 2 Sheets-Sheet 2
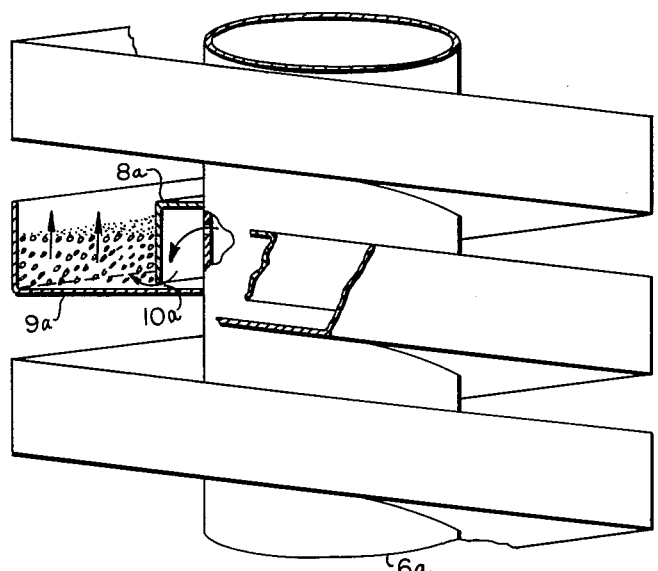
_Fig. III_
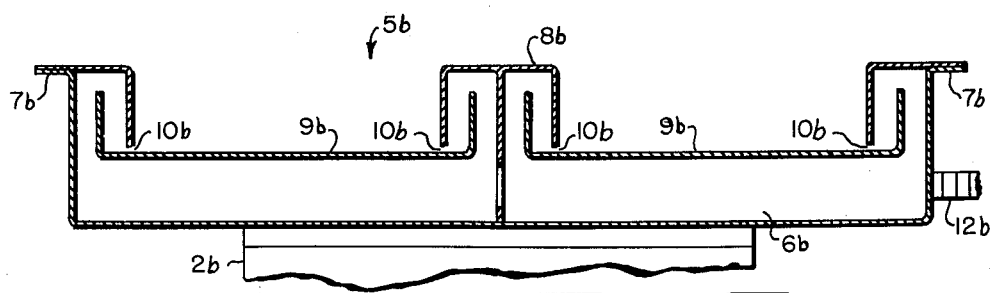
_Fig. IV_
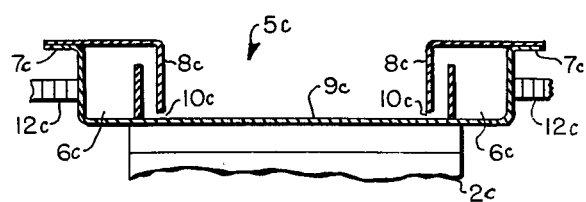
_Fig. V_
INVENTOR.
ROBLEY W. EVANS
BY
Marshall, Marshall & Yeasting
ATTORNEYS United States Patent Office 3,089,253
Patented May 14, 1963

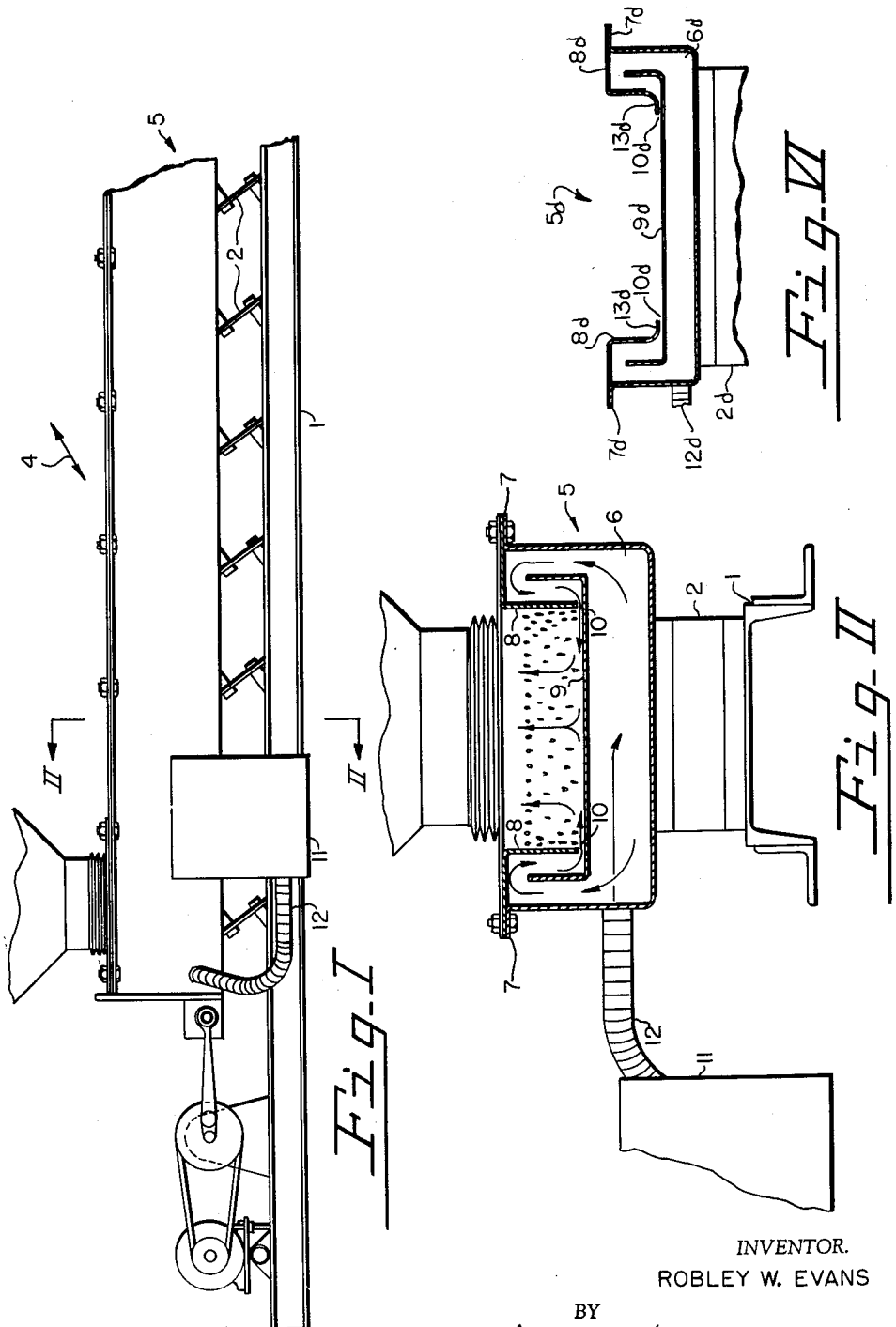

3,089,253
MEANS FOR AERATING GRANULAR AND PULVERULENT MATERIALS
Robley W. Evans, New Albany, Ind., assignor, by mesne assignments, to Chain Belt Company, Milwaukee, Wis., a corporation of Wisconsin
Filed Nov. 24, 1958, Ser. No. 776,060
16 Claims. (Cl. 34—164)

It often is desirable to aerate granular or pulverulent materials for the purpose of heating or cooling them to promote or retard polymerization or other chemical reactions, or to drive off absorbed gases or moisture or otherwise condition the materials for further processing or for storage or use.

Granular and pulverulent materials and mixtures thereof heretofore have been successfully aerated by passing them along conveyors having vibratory channels the bottoms of which were permeable to air or gas supplied from plenum chambers carried below the bottoms of such channels (see for example United States Patent No. 2,795,318 issued June 11, 1957, to John M. Morris). In the vibratory conveyor art the bottoms of vibratory channels are often called "decks."

A vibratory conveyor functions by tossing particles of material upwardly and forwardly with each vibratory cycle, and air injected in minute jets through a permeable deck of such a conveyor mingles readily with the particles that are being agitated by vibration. The openings in such a deck must be small enough to prevent loss of particles of material therethrough. Thorough cleaning of a permeable deck is difficult, and thorough cleaning is frequently necessary when the apparatus is used to process successive batches of materials which differ in color or in other characteristics.

It is an object of this invention to provide means for aerating pulverulent or granular material as it is being conveyed along a vibratory conveyor having a channel with an imperforate bottom or deck.

More specifically it is an object of this invention to provide means for blowing sheets of gas transversely across the bottom, i.e. the deck of a vibratory conveyor channel, so that as material being conveyed is tossed away from such deck by vibration, the gas rushes into the space beneath the material, from where it is forced through the material as the material and deck move toward each other to close the space during a later phase of the cycle.

Other objects and numerous advantages of the invention will become apparent upon perusal of the following specification, illustrated by the accompanying drawings, of which:

FIG. I is a side elevational view of a preferred form of conveying and conditioning apparatus embodying this invention;

FIG. II is a sectional view taken substantially as indicated by the line II—II of FIG. I;

FIG. III is a fragmentary elevational view with parts broken away and parts in section, showing an embodiment of this invention in a spiral conveyor;

FIG. IV is a fragmentary sectional view showing this invention embodied in a wide conveying and conditioning device;

FIG. V is a fragmentary sectional view showing a modified form of conveying and conditioning device embodying this invention; and FIG. VI is a fragmentary sectional view showing another modification.

This description and the accompanying drawings are intended to describe and illustrate preferred forms of the invention but not to impose limitations on its scope.

The apparatus embodying the instant invention shown in FIGS. I and II comprises a base 1 to which transverse resilient supporting members 2 are secured in longitudinally spaced-apart relation. The members 2 may be any of several types. They may consist of cantilever leaf springs comprising a plurality of glass filaments in a matrix of synthetic resin (such as are disclosed in United States Patent No. 2,829,881 issued to John M. Morris on April 8, 1958). In any case, the members 2 directionally control the movement of a conveyor assembly 5 in an inclined path of vibration indicated by the double-tipped arrow 4, the conveyor assembly 5 being supported upon and fastened to the tops of the resilient members 2.

The conveyor assembly 5 comprises a plenum chamber 6 which may be trough-shaped, as shown in FIG. II, with flanges 7 extending outwardly from its upper rims. Removably secured to the flanges 7 are angleform top members 8, the vertical portions of which dip into a conveyor channel 9. The lower edges of the vertical portions of the angleform top members 8 lie closely above the bottom of the conveyor channel 9, leaving narrow slits through which sheets of air or other gas are blown over the bottom of the conveyor channel.

The path taken by gas passing from the plenum chamber 6 into the channel 9 is shown by curved arrows in FIG. II. Even in cases in which the flow of gas is insufficient to "fluidize" the material in the channel, each vibration of the conveyor assembly 5 tosses the mass of material in the channel so that gas can flow from the slits 10 over the bottom of the chamber 9, under and up through the material that is being conveyed along the channel.

Whether the material is aerated merely to increase the speed at which it is conveyed, to dry it, to cool it, or to heat it by means of hot air, or whether the fines content of the material is fluidized, depends upon: the nature of the material being processed, the inclination or declination of the conveying channel, the air pressure in the plenum chamber and the consequent velocity of air flow, the frequency and amplitude of vibration, the widths of the slits 10, and other conditions which can be modified or adjusted according to the results desired.

In order that the widths of the slits 10 may not change during the vibration cycle, the entire assembly 5 is vibrated as a unit. The air or other gas used for treating the pulverulent or granular material may be supplied from a heater or cooler or other treating unit 11, connected to the plenum chamber 6 by a flexible tube 12.

FIG. III shows a form of the invention as incorporated in a spiral conveyor (of the general type illustrated in Patent No. 2,630,210 issued to Robert M. Carrier, Jr., on March 3, 1953). In the form shown in FIG. III a central tube 6a constitutes a plenum chamber from which air is discharged into a spiral top member 8a which dips into a spiral conveyor channel 9a, leaving slits 10a from which the air flows under and, if desired, through the tossing bed of pulverulent and/or granular material. The direction of air flow in the form of device illustrated in FIG. III is shown by arrows.

In the form of device shown in FIGS. I and II the degree of aeration is not appreciably diminished at the center of the channel 9, depending upon the conditions effecting aeration and the amount of aeration desired as discussed above. By employing the modification shown in FIG. IV, however, the width of the conveyor can be doubled or tripled or increased to any desired extent. In the form of device shown in FIG. IV the plenum chamber 6b is of double width, the number of conveyor channels 9b is doubled and an additional set of top members 8b is mounted to dip into the adjacent inner sides of the conveyor channels 9b. The form shown in FIG. IV is equivalent to a dual installation of the form shown in FIGS. I and II.

FIG. V shows a form of device in which the plenum chambers 6c extending along the sides of the channel 9c are substituted in place of the plenum chamber 6 which is shown in FIG. II as extending along the sides and bottom of the channel 9.

The practicable width of the form shown in FIGS. I and II can be increased somewhat by employing top members 8d having inwardly projecting flanges 13d along their lower edges to move the slits 10d inwardly as shown in FIG. VI.

It is only necessary to remove the top members, which are held in place by bolts, to make the top members and the channel accessible for cleaning, for example by means of an air hose or a vacuum cleaner.

Whereas in vibratory conveyors having gas-permeable decks it has been necessary to make such decks of fine screens, using thin wire, the conveyor channel in the device of this invention can be as heavy and sturdy as is required to avoid deterioration in use and damage in cleaning, whether the material being processed is coarse or fine, soft or abrasive.

The invention described above includes modifications within the spirit and scope of the invention as taught and disclosed.

I claim:

1. In apparatus for treating masses of discrete particles of materials having fluidizable components, in combination, means for imparting to such materials a series of upward and forward tosses, said means including a conveyor channel with a substantially flat imperforate floor and mechanism for vibrating said channel at an angle to said floor, members extending downwardly adjacent the sides of said channel into juxtaposition to said floor, there being slits extending longitudinally of said channel below the lower edges of said members, said members having top portions extending outwardly, means defining a plenum chamber extending below the floor of said channel and upwardly at each side of said channel, each said plenum chamber means having flanges extending therealong, means for removably securing said flanges of said plenum chamber means to said top portions, means for conditioning aeriform fluid by changing its pressure and temperature, and a conduit for conducting such aeriform fluid into such plenum chamber, whereby such tossing of materials may create spaces therebeneath and such aeriform fluid so conditioned may be injected from said slits over the floor of said channel and thence through such material at proper velocity for fluidizing fluidizable components.

2. In apparatus for treating masses of discrete particles of materials, in combination, means for imparting to such materials a rapid series of upward and forward tosses, said means including a conveyor channel with a substantially flat imperforate floor and mechanism for vibrating said channel at an angle to said floor, means forming a plenum chamber extending upwardly at each side of said channel and including a flange extending therealong, a pair of angle members removably secured to said flanges, said angle members cooperating with said channel to form longitudinal slits adjacent the floor of said channel, means for conditioning aeriform fluid by changing its pressure and temperature, and a conduit for conducting such aeriform fluid into such plenum chamber, whereby such tossing of material may create spaces therebeneath and such aeriform fluid so conditioned may be injected from said slits over the floor of said channel and thence through such material.

3. In apparatus for treating masses of discrete particles of materials having fluidizable components, in combination, means for imparting to such materials a rapid series of upward and forward tosses, said means including a conveyor channel with a substantially flat imperforate floor and mechanism for vibrating said channel at an angle to the plane of said floor, members extending downwardly adjacent the sides thereof into juxtaposition to said floor, there being slits extending longitudinally of said channel below the lower edges of said members, said members having top portions extending outwardly, means forming a plenum chamber extending below the floor of said channel and upwardly at each side of said channel, each said plenum chamber means having flanges extending therealong, and means for removably securing said flanges of said plenum chamber means to said top portions.

4. In apparatus for treating masses of discrete particles of materials having fluidizable components, in combination, means for imparting to such materials a series of upward and forward tosses, said means including a conveyor channel with a substantially flat imperforate floor and mechanism for vibrating said channel at an angle to said floor, members extending downwardly adjacent the sides thereof into juxtaposition to said floor and having top portions extending outwardly, there being slits extending longitudinally of said channel below the lower edges of said members, said members having top portions extending outwardly, means forming a plenum chamber extending upwardly at each side of said channel, each said plenum chamber means having a flange extending therealong, and means for removably securing said flanges to said top portions.

5. In conveying apparatus; a conveyor channel having an imperforate floor and upstanding sides; means for vibrating said channel such that materials carried therein have imparted thereto a series of upward and forward tosses; means defining a plenum chamber extending along at least one side of the channel with an exit slit opening horizontally into the conveying channel adjacent the floor thereof; and means for injecting an aeriform fluid through said slit beneath said material as it is tossed upwardly.

6. In conveying apparatus; a conveyor channel having an imperforate floor and upstanding sides; means for vibrating said channel such that materials carried therein have imparted thereto a series of upward and forward tosses; means defining a plenum chamber extending along at least one side of the channel; said plenum chamber means having an exit slit between a wall of the chamber and a floor of the channel; and means for injecting an aeriform fluid through said slit into the space beneath material in said channel.

7. In conveying apparatus; a conveyor channel having an imperforate floor and upstanding sides; means for vibrating said channel such that materials carried therein have imparted thereto a series of upward and forward tosses; means forming a plenum chamber extending along at least one side of said channel; a slit formed in at least one of said upstanding sides adjacent the floor of the channel providing communication from the plenum chamber to the channel; and means for injecting an aeriform fluid through said slit in sufficient quantity to fill the space between said vibrated material and said floor when said material is tossed free of said floor.

8. In conveying apparatus for handling masses of discrete particles of materials having fluidizable components; a conveyor channel having an imperforate floor and upstanding sides; means for vibrating said channel such that materials carried therein have imparted thereto a series of upward and forward tosses; means forming a plenum chamber extending along at least one side of the channel; a slit formed in at least one of said upstanding sides near the floor and communicating with the plenum chamber and means for injecting an aeriform fluid through said slit whereby said fluid fills the space between said vibrated material and said floor, when said material is tossed free of said floor, and continues upward through said material at a velocity sufficient to fluidize said fluidizable components.

9. In conveying apparatus; a conveyor channel having an imperforate floor and upstanding sides; means for vibrating said channel such that materials carried therein have imparted thereto a series of upward and forward tosses; means forming a plenum chamber extending along at least one side of the channel; a slit formed in at least one of said upstanding sides and communicating with the plenum chamber; and means for injecting an aeriform fluid through said slit beneath said material as it is tossed upwardly including means for conditioning at least one characteristic of said fluid from the family of characteristics of an aeriform fluid including pressure and temperature.

10. In conveying apparatus; a conveyor channel having an imperforate floor and upstanding sides; means for vibrating said channel such that materials carried therein have imparted thereto a series of upward and forward tosses; means defining a plenum chamber extending along at least one side of the channel; a slit formed in at least one of said upstanding sides adjacent the floor and communicating with the plenum chamber; and means for injecting an aeriform fluid through said slit whereby said fluid fills the space between said vibrated material and said floor, when said material is tossed free of said floor, and then continues up through said materials.

11. In an apparatus for treating masses of discrete particles of materials, in combination, a channel having side walls and an imperforate floor; means for vibrating the channel to toss material therein free of the floor; means extending along at least one of said side walls and into close proximity to the floor for defining a plenum chamber; said means providing a slit extending along said channel near the floor thereof; and means for supplying aeriform fluid to said plenum chamber for discharge parallel to said floor through said slit as the material is tossed free of the floor of the channel.

12. An apparatus according to claim 11 in which sufficient aeriform fluid is supplied through the slit to fluidize at least part of the material in the channel.

13. In an apparatus according to claim 11, means connected to the plenum chamber for conditioning the aeriform fluid supplied to the plenum chamber.

14. An apparatus according to claim 11 in which the channel is vibrated along an inclined path to convey material along the channel.

15. An apparatus according to claim 11 in which the means defining the plenum chamber is readily removable for cleaning.

16. An apparatus according to claim 11 in which the means defining the plenum chamber includes a portion extending parallel to said floor and beneath material in said channel.

References Cited in the file of this patent

UNITED STATES PATENTS

| | | |
|---|---|---|
| 1,761,149 | Peebles | June 3, 1930 |
| 2,164,056 | Engelmann | June 27, 1939 |
| 2,385,140 | Knowles | Sept. 18, 1945 |
| 2,795,318 | Morris | June 11, 1957 |
| 2,847,767 | Carrier | Aug. 19, 1958 |

FOREIGN PATENTS

| | | |
|---|---|---|
| 512,036 | Great Britain | Aug. 28, 1939 |